United States Patent [19]
Little

[11] Patent Number: 5,325,604
[45] Date of Patent: Jul. 5, 1994

[54] AUTOMATIC CONTROL SYSTEM FOR WOOD DRYING KILN

[75] Inventor: Robert L. Little, Knoxville, Tenn.

[73] Assignee: The University of Tennessee Research Corporation, Knoxville, Tenn.

[21] Appl. No.: 992,461

[22] Filed: Dec. 17, 1992

[51] Int. Cl.⁵ .................................................. F26B 3/02
[52] U.S. Cl. ........................................ 34/493; 34/541; 34/557; 34/565; 34/536
[58] Field of Search ................... 34/44, 46, 48, 50, 54, 34/13.8, 26, 29.30, 34, 16.5

[56] References Cited

U.S. PATENT DOCUMENTS

| | | | |
|---|---|---|---|
| 1,086,567 | 2/1914 | Stone | 34/54 |
| 1,593,890 | 7/1926 | Welch | 34/89 |
| 3,131,034 | 4/1964 | Marsh | 34/30 |
| 3,233,334 | 2/1966 | Hamilton | 34/54 |
| 3,522,663 | 8/1970 | Grimmelt et al. | 34/54 |
| 3,744,144 | 7/1973 | Weis | 34/50 |
| 4,176,464 | 12/1979 | Randolph | 34/16.5 |
| 5,146,692 | 9/1992 | Ogiri et al. | 34/36 |
| 5,226,241 | 7/1993 | Goodwin | 34/46 |

OTHER PUBLICATIONS

R. L. Little, *Tenn. Farm and Home Sci*, Fall 1989, pp. 32–36.
R. L. Little, *Sensors*, Sep. 1988, pp. 49–57.
R. L. Little, et al., *For. Prod. J.*, Nov./Dec. 1986, pp. 72–74.

*Primary Examiner*—Denise Gromada
*Attorney, Agent, or Firm*—Notaro & Michalos

[57] ABSTRACT

System for kiln-drying hardwood wherein the weight of a representative sample positioned remote from the batch of wood to be dried is monitored. The moisture content of the representative sample is calculated from the measured weight continuously and operational parameters with the kiln are automatically adjusted in response to the moisture content of the sample to provide desired drying conditions.

14 Claims, 5 Drawing Sheets

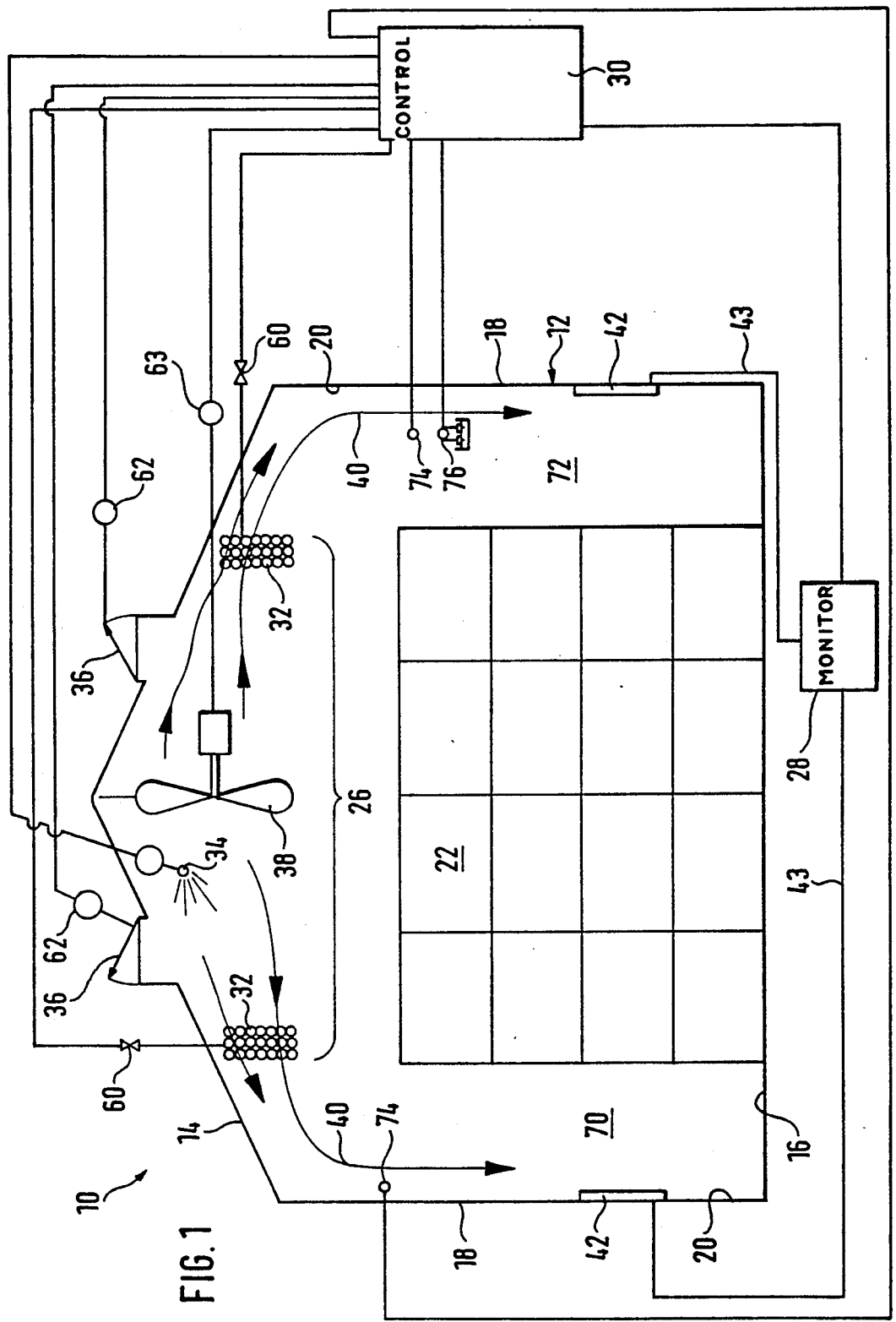

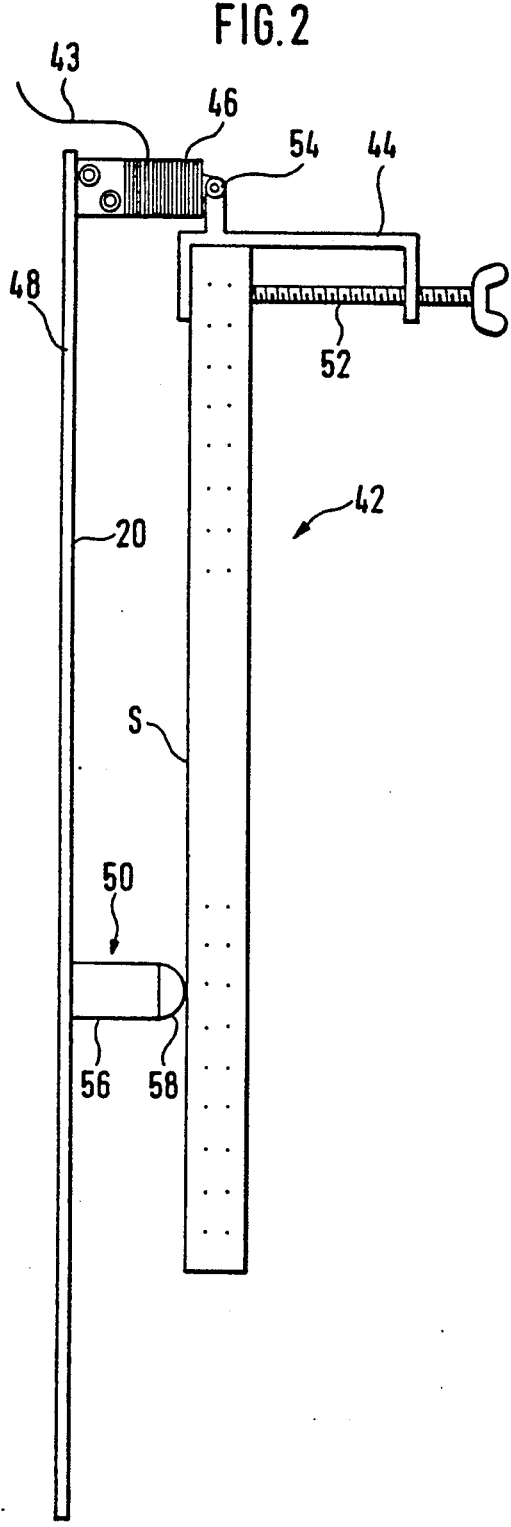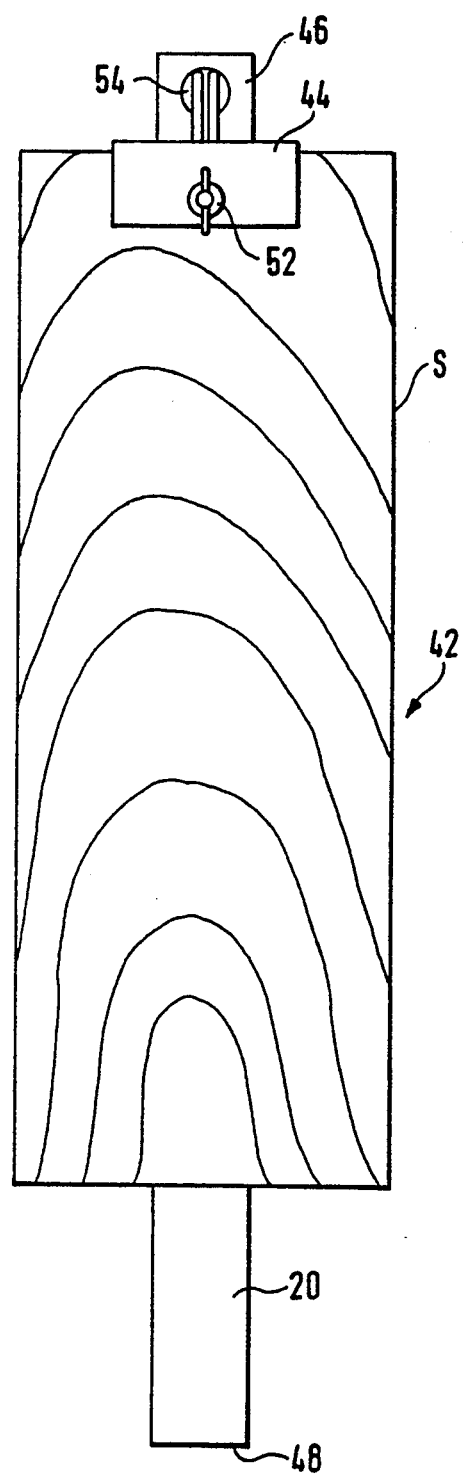

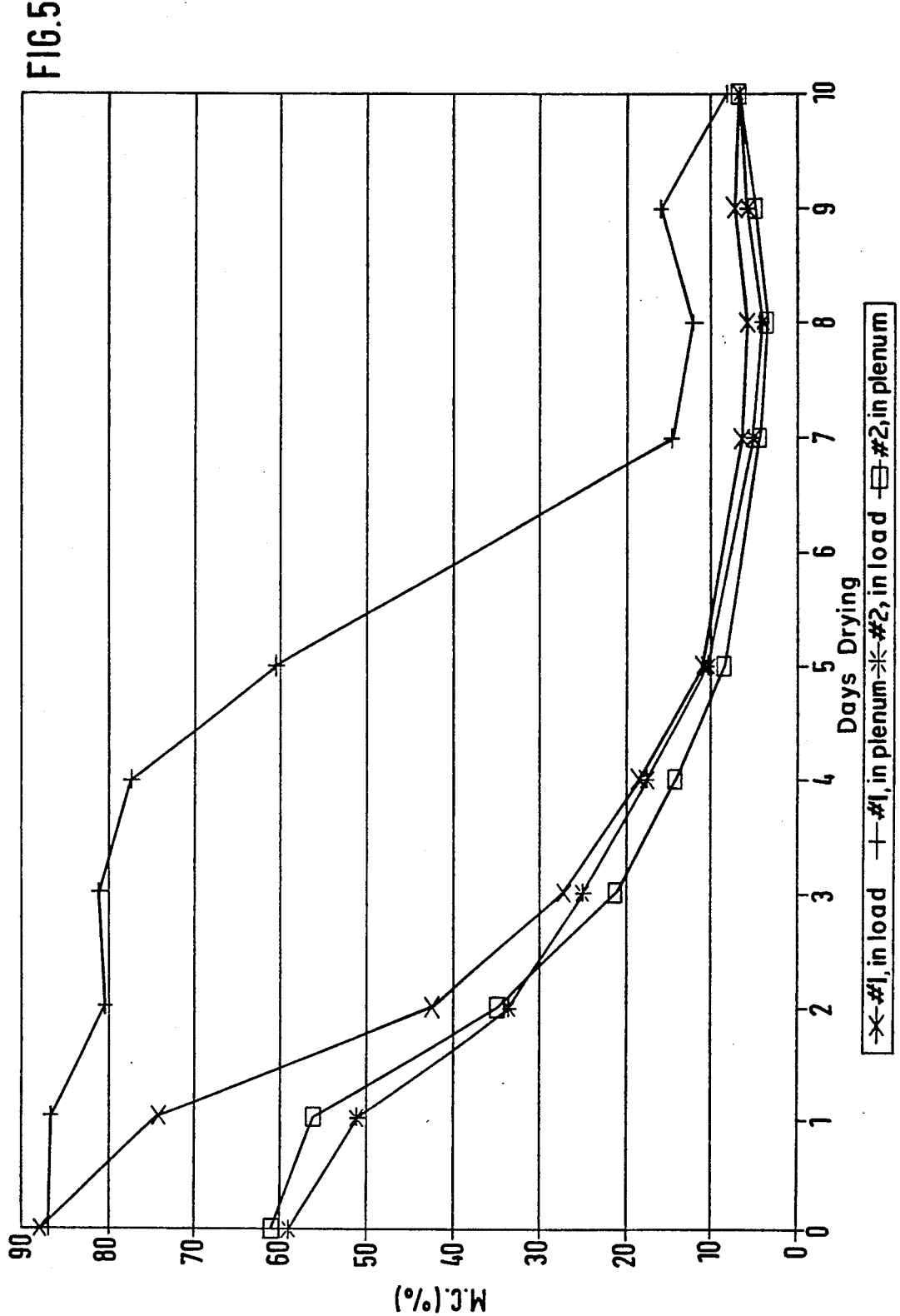

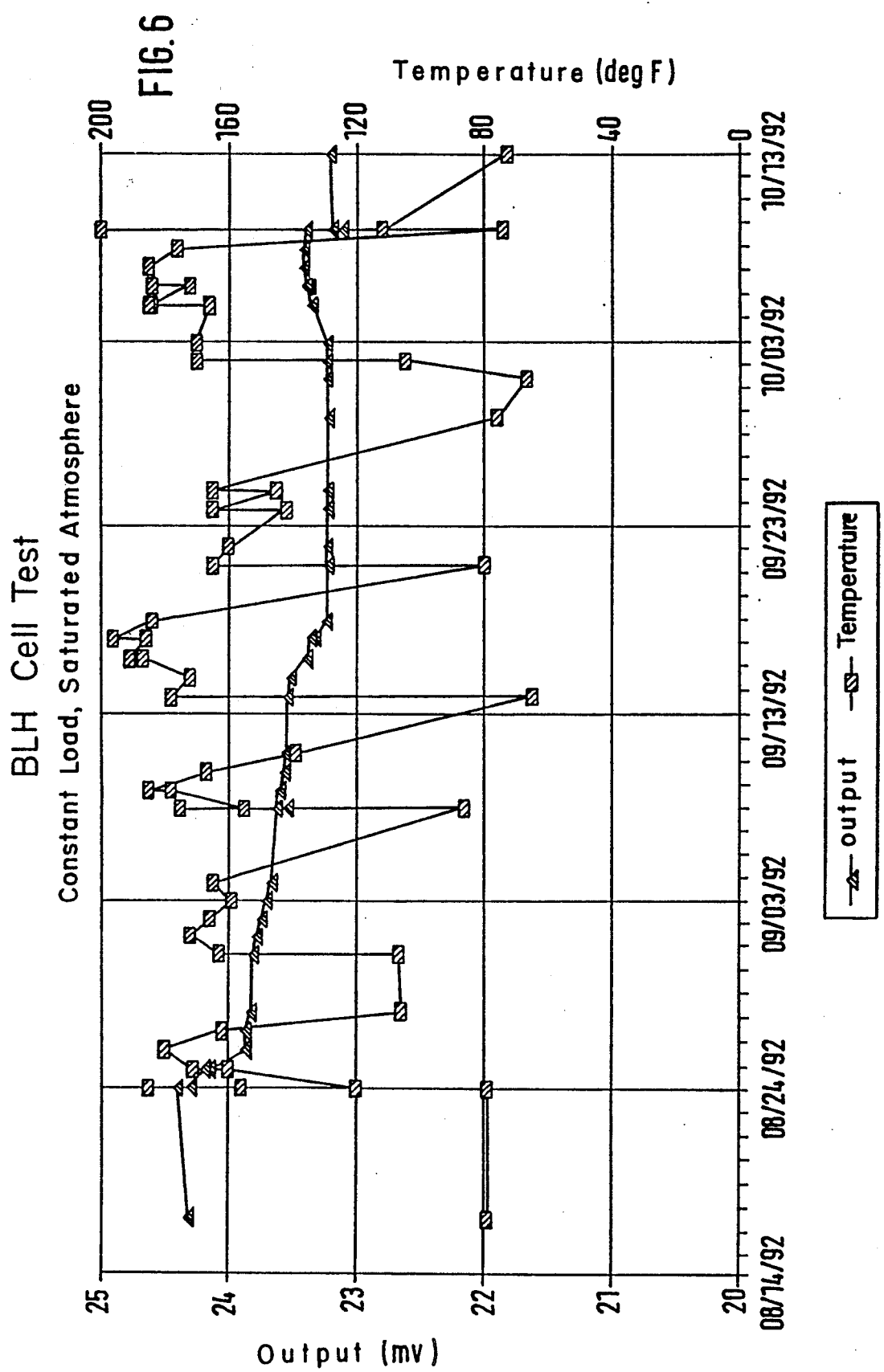

AUTOMATIC CONTROL SYSTEM FOR WOOD DRYING KILN

FIELD AND BACKGROUND OF THE INVENTION

The present invention relates, in general, to kilns for drying and, in particular, to a new and useful control system for temperature and humidity within a kiln for drying hardwoods.

It is known that by controlling the temperature and humidity within the interior of a hardwood kiln, lumber positioned within the kiln may be dried at a controlled rate to minimize drying related defects of the lumber as it is dried. In order to control the kiln temperature and humidity, a sample piece of lumber is selected from the lumber being dried, and the moisture content of the sample is determined outside the kiln, at preselected intervals of time. With the moisture content information, the kiln temperature and humidity are altered, if necessary, to ensure that the lumber is dried at the desired rate.

The moisture content of the lumber sample is typically determined by periodically removing the sample from the kiln and weighing the removed sample or measuring an electrical characteristic, such as the conductivity, of the removed sample. The moisture content of the lumber sample may then be calculated or otherwise derived from the information obtained from the removed sample.

Such a process is time-consuming, is susceptible to error in calculating the moisture content, is likely to effect the environment of the kiln interior as the kiln interior is exposed to ambient conditions during removal of the sample from the kiln and is uncomfortable and potentially dangerous in that the operator must enter the hot kiln. In addition, the sample used to monitor the moisture content is re-positioned within the bulk of the lumber situated within the kiln following each moisture-determining operation. Such a re-positioning of the sample renders it inaccessible for unhindered visual inspection.

The drying of hardwood lumber requires kilns of significantly different design from those for drying softwood lumber. Hardwood drying kilns must be controlled as to temperature and humidity and to a far more accurate extent. For example, kilns for drying softwood such as pine, can use simple thermocouples for monitoring temperature. Much more accurate temperature sensors are needed in kilns for drying hardwoods, however, since control of drying to 1° Fahrenheit is necessary and critical. For additional details, see the article "Process Control in Drying Hardwood Lumber", R. L. Little, *Sensors*, September 1988, pages 49-57.

In hardwood kilns, the conventional wisdom requires that multiple samples which are removed from the kiln for periodic moisture measurements, be repositioned within the lumber charge in a horizontal orientation, that is parallel to the air stream through the charge. As will be explained in the following, the present invention represents a substantial diversion from conventional thinking and results in a highly accurate measurement apparatus and technique for controlling hardwood kilns.

U.S. Pat. No. 1,593,890 to Welch, discloses an apparatus for drying wood which includes a balance beam for weighing a wood sample held in a horizontally extending position and at a non-disclosed location in the kiln. Nothing is mentioned in the reference on the survivability of the equipment within the corrosive, quickly-moving, hot, moist atmosphere in a kiln.

SUMMARY OF THE INVENTION

It is an object of the present invention to provide an improved system and associated method for use in the control of the environmental conditions, e.g. the temperature and humidity, of a kiln, based on a continuous determination of the moisture content in one or more wood samples placed in the kiln.

Another object of the present invention is to provide such a system and a method which circumvents the need for removing samples from the kiln at predetermined intervals in order to determine their moisture content and which circumvents the need for positioning samples within the bulk of a lumber charge in the kiln.

Still another object of the present invention is to provide such a system which can continuously determine moisture content in the samples, which is uncomplicated in structure and effective in operation.

Generally described, the present invention uses a kiln for drying a batch or charge of lumber positioned within the kiln, the kiln comprising a housing having an interior wall surface, a heater and a humidification unit for heating and humidification and fans for air circulation within the kiln. The kiln has an area within the housing for placement of the batch of lumber for drying of the lumber and the invention comprises a monitor for continuously monitoring one or more physical characteristics of samples from the batch of lumber and from which the moisture content of the samples may be determined. The monitor comprises supports positioned adjacent the interior wall surface of the kiln, at a spaced location from the lumber charge, for supporting samples adjacent the interior wall surface, a sensor operatively associated with the supports for sensing the physical characteristic of the samples, and a signal generator operatively associated with the sensors for generating a signal corresponding to the physical characteristics of the samples. A controller operatively associated with the heater, humidification and air circulation systems is provided for controlling the heat, humidity and air flow within the kiln in response to a signal received from the signal generator.

A principal reason for positioning the sample on the wall of the kiln and in a vertical position, rather than in the charge of lumber in a horizontal position, is the nuisance of having to insert and remove cables when kiln lumber charges are switched. Additionally, the somewhat delicate electronic equipment associated with automatic moisture sensing is subject to damage when the lumber is loaded and unloaded with a forklift. If the sample were positioned within the lumber charge, corresponding to conventional wisdom on the best placement for a sample, some of the samples would not be visible to a forklift operator, who may easily and inadvertently damage or destroy monitoring equipment connected to the samples by removing the charge.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 1 is a diagrammatic representation of one type of kiln utilized to dry hardwood in accordance with the present invention;

FIG. 2 is a side view of apparatus utilized to continuously measure the weight of a sample of wood for use in electronically calculating its moisture content in accordance with the present invention;

FIG. 3 is a front view of the apparatus of FIG. 2;

FIG. 5 is a graph similar to FIG. 4 illustrating how an improper positioning of a sample drastically affects the moisture content of this sample and thus its usefulness in representing the moisture content of lumber in the charge; and FIG. 6 is a graph plotting load cell output used for measuring the weight of a sample against time and under highly fluctuating temperatures, to simulate long-term operation and survivability of the load cell in a simulated long-term kiln environment.

DESCRIPTION OF THE PREFERRED EMBODIMENTS

Figure 4:
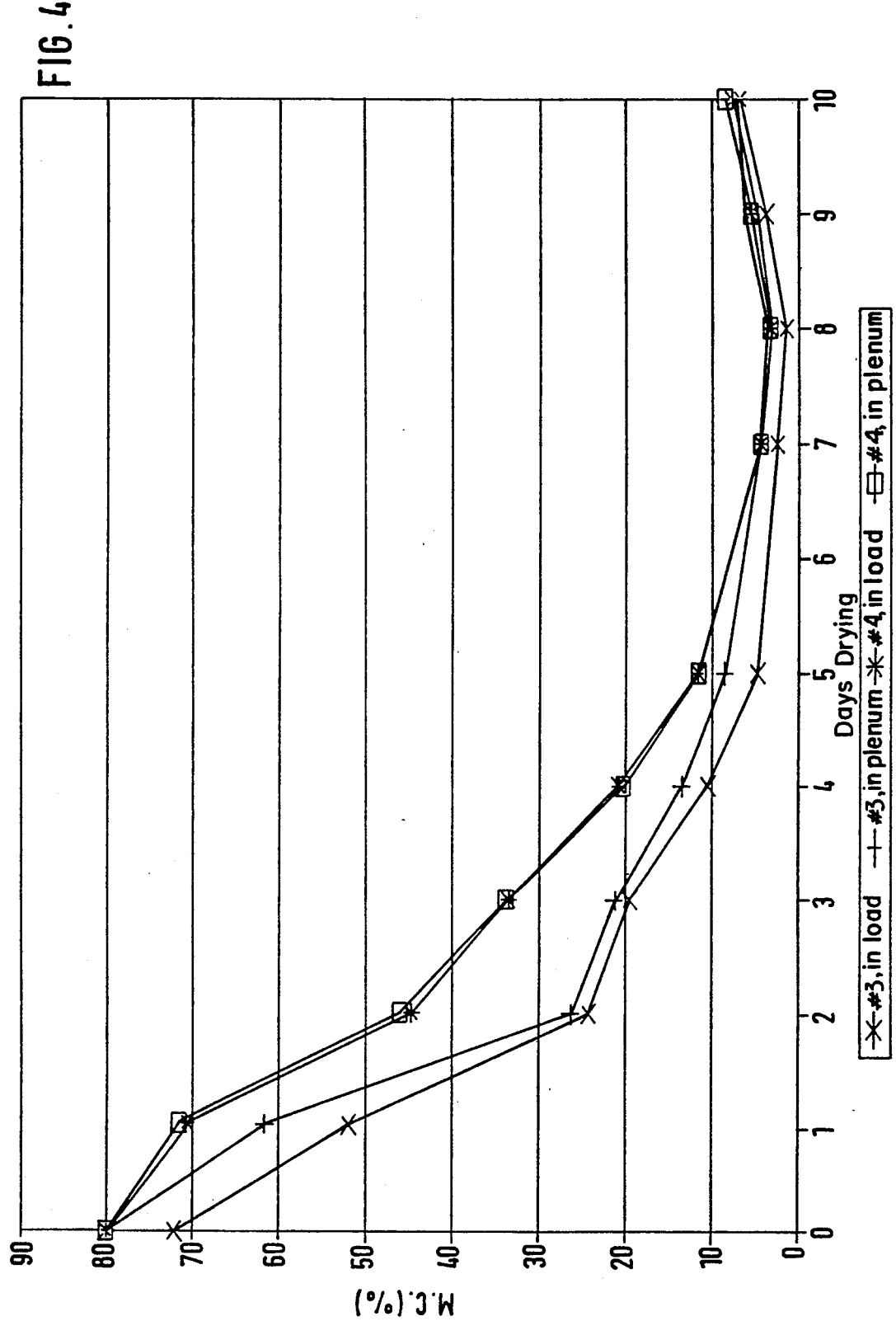
FIG. 4 is a graph plotting moisture content against days of drying in an actual hardwood kiln for determining the sensitivity of moisture content to sample position in the kiln.

With reference to the drawings, in which like reference characters refer to like or functionally similar parts, FIG. 1 is a diagrammatic representation of a system 10 embodying various features of the present invention. The system 10 includes a kiln housing 12 having a roof 14, a floor 16, and a plurality of walls 18, each wall having an interior surface 20. A batch or charge of lumber in a stack 22 is positioned within a central region of the housing for drying thereof by a drying system 26.

A sample monitoring system 28 is provided for continuously monitoring a physical characteristic, in particular weight, of multiple representative wood samples from the batch of lumber. The monitor system 28 is connected to one or more cell fixtures 42 within the housing, as will be explained more fully below, to support samples of the lumber within the housing at locations remote from the batch of lumber 22. The cell fixtures 42, shown in detail in FIGS. 2 and 3, each continuously measure the weight of a sample S attached to the fixture. The moisture content of the sample is determined from its weight by calculation using a computer and appropriate algorithm in system 28. A control system 30 is provided to interact with the drying system 26 and the monitoring system 28 to control the environment of the kiln based on the moisture content of the representative samples to provide desired dying conditions within the kiln. In addition, the system provides precise control of kiln conditions, automatic changes in the drying schedule, and monitoring and recording capabilities of several kiln variables. In practice, the monitoring system 28 and control system 30 are one unit for performing all the needed functions.

The drying system 26 includes known heat and humidity devices such as heating coils 32, a steam sprayer 34, vents 36, and a motor driven fan 38, for circulating an airflow 40 within the housing 12 for drying of the lumber 22. It will be understood that the kiln parameters, such as air flow, loading, temperature, and humidity will depend upon the species and condition of the lumber 22. These parameters may be selected in accordance with typical dry kiln schedules such as *Dry Kiln schedules for commercial Woods, Temperate and Tropical*, available from the U.S. Forest Service. Heating and humidification as provided by the drying system is regulated by the control system 30, as guided by inputs from the monitoring system 28, to provide desired drying conditions for a given batch of lumber.

In actual practicing of the present invention, more than two samples would be used, for example, eight samples each with their own load cell fixture located on the end walls of the kiln in plenum areas 70 and 72; and away for direct spraying, e.g. from sprayer 34. The samples hang vertically and are advantageously spaced from the wall and parallel to the air stream within the plenums. The samples are selected to be representative of the lumber charge and are generally short lengths of wood on the order of 12" long. These are cut from a board in the charge 22. Short, perhaps 1" lengths of wood, are cut from each end of the sample and are weighed first wet, then are artificially dried in an oven and weighed dry. This establishes a relationship between weight and moisture content for the larger sample whose ends are coated with waterproof material such as tar. Such a sample is used both in the prior art conventional manner by replacement into the lumber charge, and according to the present invention, by hanging in the fixture of the invention. One embodiment of the fixture is illustrated in FIGS. 2 and 3.

With reference to FIGS. 2 and 3, the monitoring system 28 monitors electrical signals corresponding to the weight of the samples. The cell fixtures 42 are electrically connected to the monitoring system 28 by leads 43, for example. Each load cell fixture continuously monitors the weight of a representative sample S. From the weight of each representative sample, the moisture content of each sample may be determined. The moisture contents of the samples are then utilized by the control system to regulate the drying system to provide desired, e.g. optimum, drying conditions within the kiln.

Each load cell fixture 42 includes a clamp 44, a load cell 46, a mounting surface 48, and a stabilizer 50. The clamp 44 may, for example, be a "C" clamp and preferably includes an adjustment screw 52 for securing the representative sample of lumber within the clamp. The clamp is pivotally attached to the load cell by a hinge 54 so that the sample S hangs substantially vertically from the load cell. The load cell 46 is preferably a transducer-type load beam or strain gauge which is electrically configured to form a balanced wheatstone bridge. Such gauges are well known in the art and a particularly suitable gauge is an Alpha (a trademark) load beam available from BLH Electronics of Canton, Mass. Each load cell 46 may be attached, such as by bolts, to the mounting base 48, which is attached to the inner surface 20 of one of the walls 18 in the plenum of the kiln. The stabilizer 50 preferably has shock-dampening qualities and is also attached directly to the mounting base 48 and is spaced from the clamp 44 and positioned to contact the representative sample S in a spaced relationship with the mounting base 48. In the embodiment shown, the stabilizer 50 is provided by a block of aluminum or stainless steel 56 attached to the mounting base 48 and includes a tip 58 provided by a stainless steel spring. Block 56 may alternatively be any other material that can survive the corrosive, hot moist environment inside the kiln for a usefully long period of time.

Since the sample is typically anywhere from 1 to 4 inches in thickness, clamp 44 or any other equivalent apparatus must have a sufficiently long stroke to accommodate different sample thicknesses in a rapid, yet secure, manner. A sliding grip, clip or other like structure, may be provided which must be made of material that is corrosion resistant and also resistant to temperature extremes prevalent in the kiln. Springs may fatigue, threads may corrode and other problems may occur. One ideal material for the clamp or equivalent structure is plastic. Plastic should be selected which is resistant to fatigue and creep, however. Stainless steel structures may also be utilized because of their corrosion-resistant characteristics.

Care must be taken not to artificially affect or influence the sample weight on the load cell 46 or other equivalent mechanism for accurately measuring weight, and further that the sample hang vertically at a spaced yet proximal location to a wall of the kiln in one of the plenums. This is so that the air stream in the plenum passes parallel to the broad surfaces of the sample, which is the same direction the air passes the broad surfaces of the wood in the charge. The sample is thus exposed to the same drying conditions to accurately simulate drying of the entire stack.

A plurality, for example, eight weight measurements are taken from e.g. eight load cells and samples and either used in groups of two, for example, or averaged together to provide a good measurement for the average drying conditions within the lumber stack. Care should be taken to avoid positioning the sample to face oncoming air and also to keep it away from specialized equipment such as the steam sprayer 34.

Referring to FIGS. 4 and 5, FIG. 4 shows one of multiple runs which were conducted at an actual commercial hardwood kiln facility to determine whether placement of a sample within a lumber charge or load as opposed to placement of the sample outside of the load, effects drying rate on the sample. With samples No. 3 and 4 for which results are illustrated in FIG. 4, the drying rates were virtually identical whether the sample was in the load or out of the load. This illustrates the fact that the conventional thinking of the prior art that the sample must be in the load is not correct and that careful placement of the sample outside of the load as in the present invention, so that it is more accessible and less susceptible to damage, will still provide moisture content changes in the sample which are characteristic of moisture content changes in the load proper.

It is important that careful positioning be observed, however, as illustrated in FIG. 5, where sample No. 1 was placed in a plenum, too close to a steam spray nozzle. This retarded the drying of the sample compared to drying of samples within the load.

Because of the corrosive and hostile environment within the kiln, care must also be taken in selecting the load cell. The BLH load cell used according to a preferred embodiment of the present invention was tested in a manner illustrated in FIG. 6. Over the course of two months, the load cell was subjected to a saturated atmosphere and periodic variations in temperature. This was done to simulate aging within a kiln used over a period of years. Slight reduction in the output signal of the load cell was detected, but this was well within the resolution obtained with calculations used to convert the weight of the sample to moisture content of the sample according to the present invention.

Returning to FIG. 1, the control system 30 monitors operational parameters within the kiln housing 12 and generates electrical signals in response to the measured operational parameters and input from the monitoring system 28. These electrical signals are output to control devices associated with the various components of the drying system. For example, the control system 30 receives information from a plurality of sensors including dry bulb temperature probes 74 and a wet bulb temperature probe 76 provided within the plenum 72 in the interior of the kiln housing. These sensors must be of the accurate, e.g. an RTD type, and commonly provide a continuous monitoring of the dry-bulb temperature within the kiln, and the wet-bulb temperature within the kiln.

Other parameters such as the air flow through the batch of lumber 22, the dew-point temperature of exhausted vent air, the air flow through the vents, the ambient dry-bulb temperature, the ambient dew-point temperature, and characteristics of the steam flow, temperature and pressure may also be used with the invention, but are primarily useful as research tools. Generally, only the wet and dry bulb temperatures are needed for a commercial system. This information is then compared, such as by a computer having a database containing the drying schedules and an appropriate control algorithm, in system 28, to the moisture content of the representative samples of lumber as derived from the weight of the samples for determination of the desired drying conditions for a particular drying schedule. An example of a suitable control algorithm is that which is shown in FIG. 1 of *Design of a Computer Based Controller-Recorder for an Experimental Dry Kiln*, Forest Prod. J. 36 (11/12):72–74. The various components of the drying system are then adjusted to provide the desire drying conditions. To this end, as shown in FIG. 1, pneumatic or solenoid valves 60 and 61, an actuator motor 62, and a variable frequency drive 63 may be provided to control the heating coils 32, the steam sprayer 34, the vents 36, and the operation of the fan 38, respectively, in response to electrical signals output from the control system 30.

One example of the prior art technique for adjusting temperature and humidity within the kiln in a stepwise fashion, is an 8-step schedule shown in the following table used for red oak, which is a hardwood species.

TABLE

| Step | Moisture content | Temperature | | Equilibrium moisture content | Relative humidity |
| --- | --- | --- | --- | --- | --- |
| | | Dry-bulb | Wet-bulb | | |
| | pct | °F. | | pct | |
| 1 | Above 50 | 110 | 106 | 17.6 | 87 |
| 2 | 50 to 40 | 110 | 105 | 16.3 | 84 |
| 3 | 40 to 35 | 110 | 102 | 13.6 | 76 |
| 4 | 35 to 30 | 110 | 96 | 9.9 | 60 |
| 5 | 30 to 25 | 120 | 90 | 5.5 | 32 |
| 6 | 25 to 20 | 130 | 90 | 4.0 | 22 |
| 7 | 20 to 15 | 140 | 90 | 2.9 | 15 |
| 8 | 15 to Final | 180 | 130 | 3.5 | 26 |

It is known that the relative humidity can be calculated as a function of the difference between the dry and wet bulb temperatures. The air flow is also reversed during phases of the drying operation, e.g. every six hours, by reversing the rotation of fan 38 for directing air first in the direction of air flow 40 to the left which brings the air first to plenum 70 where it turns then moves transversely through the stack 22 and then to the plenum 72 to be returned to the fan, and then to the air flow 40 to the right, for reversed air flow. Dry bulb temperature is taken from the dry bulb 74 in the plenum which first receives air from the fan so that with each reversal, the dry bulb used is switched.

To operate the system, the operator selects one or more representative samples S from the batch of lumber 22 being dried in the same manner that would be practiced for known manually-controlled kiln drying operations. After determining the initial moisture content of the samples, which may be accomplished by conventional techniques, each sample is clamped to one of the load cell fixtures 42 located within the kiln housing. For some drying operations, two representative samples may be sufficient. However, in most cases, such as when there is a significant variation in the initial moisture content of the lumber or when lumber of multiple species or thicknesses are dried in the same charge, it is desirable to select multiple samples representative of the upper end of the moisture content and representative of the lower end of the moisture content and the different wood types and shapes that may be present. The system conditions are then selected in accordance with the appropriate drying schedule for the initially determined moisture content of the sample or samples. As drying progresses, the monitoring system 28 monitors the real-time output of each load cell 42, converts this to moisture content, and utilizes the moisture content information to determine the desired theoretical temperature and humidity values within the kiln in accordance with the appropriate drying schedule. The theoretical conditions are then compared to the actual conditions within the kiln housing, as measured by the sensors. Electrical signals are generated by the control system 30 in response, to adjust the appropriate control devices 60–63 and thereby regulate the drying system to achieve the desired kiln environment.

It is noted that several properly selected samples are needed and accurate control provided so that the kiln conditions satisfy both the needs of the fast-drying parts of the charge and the slow-drying parts. To avoid over-drying, the kiln conditions may have to slow the drying of the fast-drying lumber, so that the slow-drying lumber can "catch up", and ideally, all lumber in the stack reach the final desired moisture content at the same time. Also the invention is not limited to kilns for hardwoods. Pine or other softwoods, if used for furniture or other fine work may also be dried with the system of the invention.

While specific embodiments of the invention have been shown and described in detail to illustrate the application of the principles of the invention, it will be understood that the invention may be embodied otherwise without departing from such principles.

What is claimed is:

1. A method for controlling environmental conditions of a kiln within which a stack of lumber is dried comprising the steps of:
    providing a sensor within the kiln and from which a sample from the stack can be suspended and which generates a signal corresponding to the weight of the sample, at a spaced location from the stack but in the kiln;
    positioning the sensor adjacent an interior wall of the kiln and clamping the sample to the sensor so that the weight of the sample is suspended from the sensor;
    determining the actual moisture content of the sample continuously as a function of the weight of the sample and the signal generated by the sensor;
    comparing the actual moisture content of the sample with the moisture content which the sample is desired to possess; and
    altering environmental conditions in the kiln in accordance with variations detected between the actual moisture content and the desired moisture content.

2. A method according to claim 1, including providing a plurality of sensors each for a different representative sample from the stack.

3. A method according to claim 2, wherein each sample has broad opposite sides, the kiln including plenums on opposite sides of the stack, the samples being suspended in one of the plenums adjacent an anterior wall of the kiln.

4. A method according to claim 3, wherein the kiln includes at least one spray nozzle, the method including suspending the samples at a spaced location from the nozzle.

5. A monitoring system for a wood drying kiln having a housing with an interior wall surface, an area within the housing for placement of a charge of wood for drying of the charge of wood, and means for heating and humidifying the interior of the kiln, the monitoring system comprising:
    support means positioned adjacent the interior wall surface for supporting a representative sample of the charge of wood adjacent the interior wall surface and remote from the charge of wood;
    sensor means operatively connected to the support means for sensing a physical characteristic of the sample which is a function of moisture content in the sample;
    signal generation means operatively connected to the sensor means for generating a signal corresponding to moisture content of the sample as a function of the physical characteristic;
    control means operatively connected to the means for heating and humidifying the interior of the kiln and to the signal generation means for controlling the heat and humidity within the kiln in response to the signal received from the signal generation means;
    the kiln including means defining a pair of plenums on opposite sides of the area within the housing for placement of a charge of wood, air circulation means above the area for circulating air from one plenum through the charge of wood to the opposite plenum, the support means being positioned in one of the plenums and structured to hold a sample in a vertically suspended orientation with broad sides of the sample extending parallel to a flow of air in the plenum.

6. A system according to claim 5, wherein the physical characteristic sensed by the sensor means comprises the weight of the sample.

7. A system according to claim 6, wherein the support means are structured to suspend a sample with a broad side of the sample extending parallel to the interior wall surface.

8. A system according to claim 5, wherein the kiln includes at least one spray nozzle, the support means being spaced away from the nozzle.

9. A monitoring system for a wood drying kiln having a housing with an interior wall surface, an area within the housing for placement of a charge of wood for drying of the charge of wood, and means for heating and humidifying the interior of the kiln during a drying process, the monitoring system comprising:

support means positioned in the housing and adjacent the interior wall surface for supporting a representative sample of the charge of wood in the housing and adjacent the interior wall surface and remote from the charge of wood during the drying process;

sensor means operatively connected to the support means for continuously sensing a physical characteristic of the sample which is a function of moisture content in the sample, during the drying process;

signal generation means operatively connected to the sensor means for generating a signal corresponding to moisture content of the sample as a function of the physical characteristic; and control means operatively connected to the means for heating and humidifying the interior of the kiln and to the signal generation means for controlling the heat and humidity within the kiln in response to the signal received from the signal generation means.

10. A system according to claim 9, including a plurality of support means each positioned in the housing and adjacent the interior wall surface for supporting a separate representative sample of the charge of wood adjacent the interior wall surface and remote from the charge of wood during the drying process and in the housing, and a separate sensor means operatively connected to each support means for continuously sensing a physical characteristic of each sample which is a function of the moisture content in each sample during the drying process.

11. The system of claim 10, wherein each sensor means senses the weight of the sample.

12. The system of claim 11, wherein the support means comprises a load cell fixture.

13. The system of claim 12, wherein the load cell fixture comprises a load cell mounted adjacent the interior wall surface of the kiln remote from the charge of wood and means for suspending the sample from the load cell so that the load cell supports the weight of the sample.

14. The system of claim 13, wherein the means for suspending the sample comprises a clamp pivotally attached to the load cell for receiving an end of the sample.

* * * * *